Figure 1:
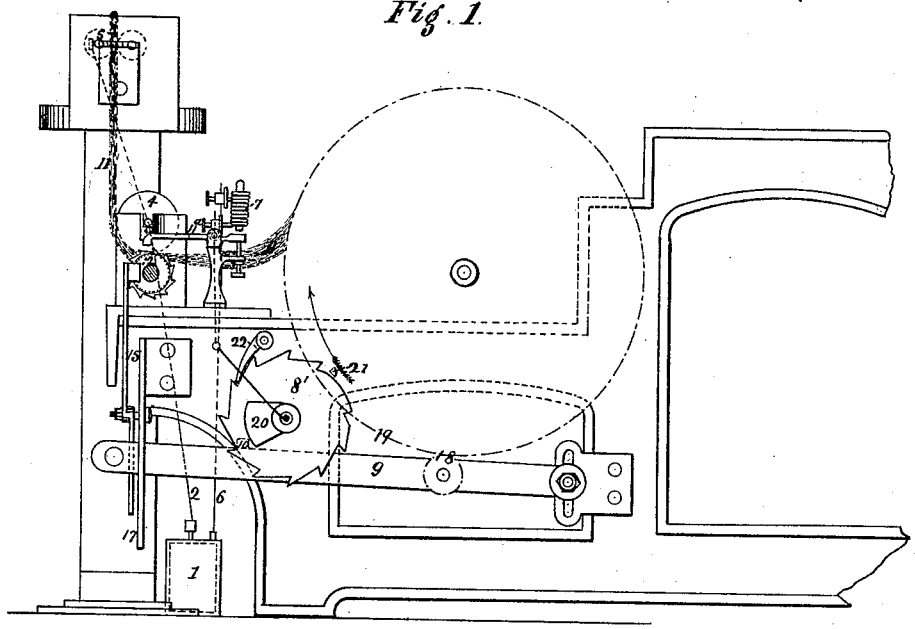

6 Sheets—Sheet 1.

J. BULLOUGH.
ELECTRIC STOP-MOTIONS FOR COTTON MACHINERY.

No. 185,164. Patented Dec. 12, 1876.

Witnesses
W. T. Hutchinson
W. R. Edelen

Inventor
John Bullough
by John J. Halsted
Atty.

THE GRAPHIC CO. N.Y.

6 Sheets—Sheet 2.

J. BULLOUGH.
ELECTRIC STOP-MOTIONS FOR COTTON MACHINERY.

No. 185,164. Patented Dec. 12, 1876.

Witnesses
W. J. Hutchinson
W. R. Edelen

Inventor
John Bullough
by
J. J. Halsted
Atty.

J. BULLOUGH.
ELECTRIC STOP-MOTIONS FOR COTTON MACHINERY.

No. 185,164. Patented Dec. 12, 1876.

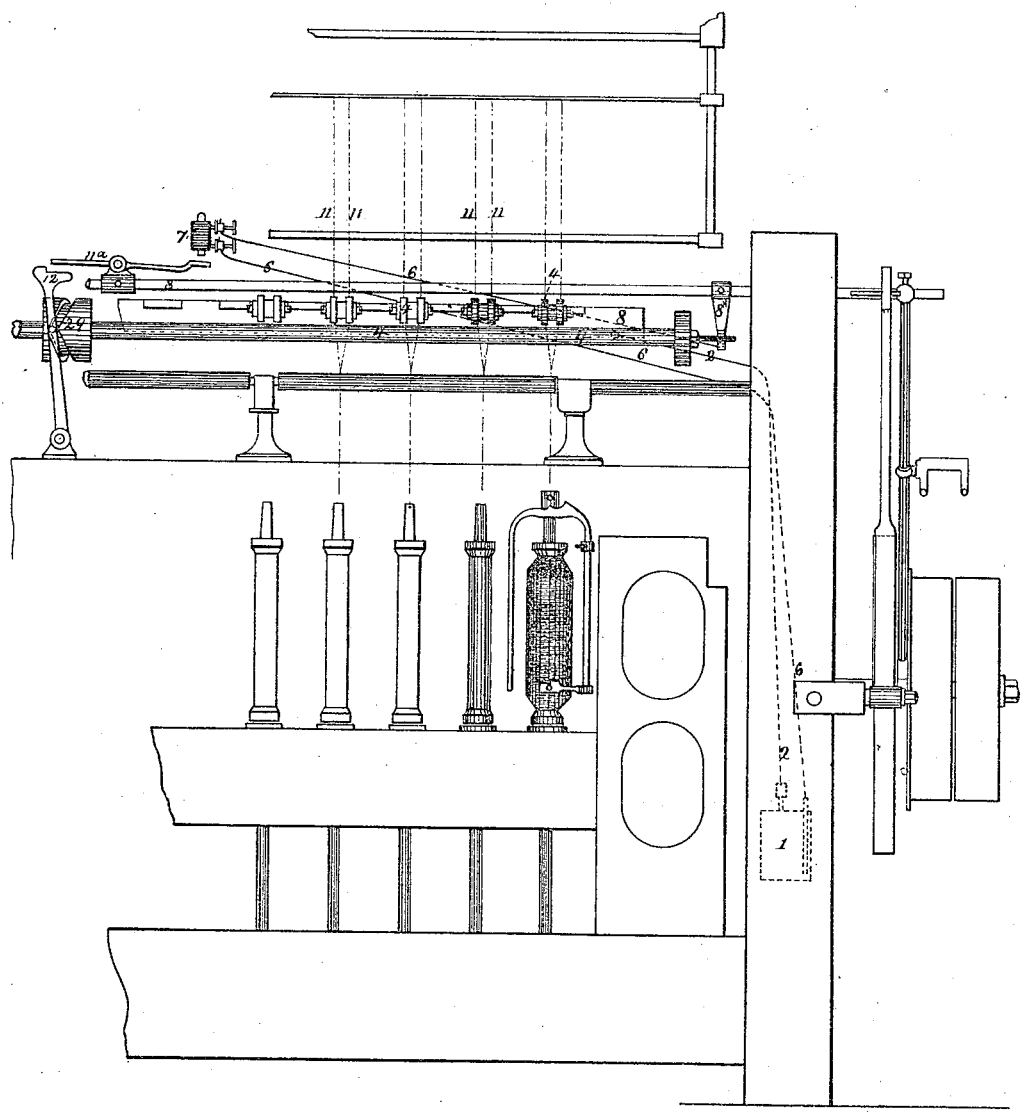

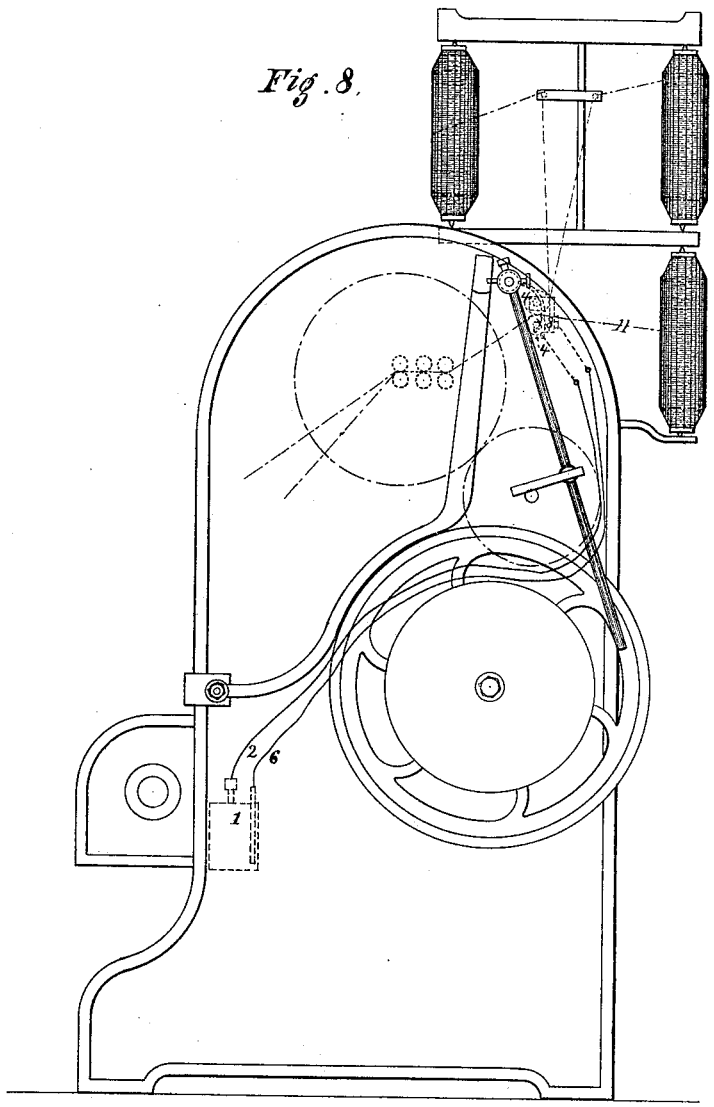

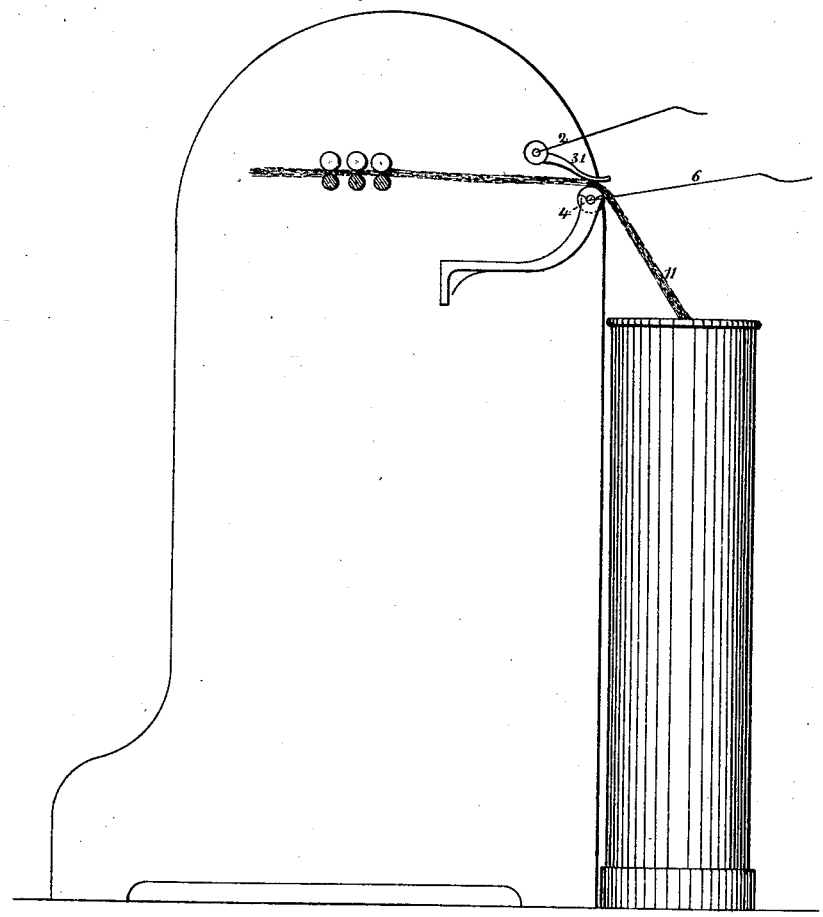

UNITED STATES PATENT OFFICE.

JOHN BULLOUGH, OF ACCRINGTON, ENGLAND.

IMPROVEMENT IN ELECTRIC STOP-MOTIONS FOR COTTON MACHINERY.

Specification forming part of Letters Patent No. 185,164, dated December 12, 1876; application filed September 1, 1876.

*To all whom it may concern:*

Be it known that I, JOHN BULLOUGH, of Accrington, in the county of Lancaster, England, have invented certain new and useful Improvements in Stopping-Motions applicable to Machinery for Preparing Cotton and Yarn, and other fibrous substances; and I do hereby declare that the following is a full, clear, and exact description thereof, which will enable others skilled in the art to which it appertains to make and use the same, reference being had to the accompanying drawings, and to letters of reference marked thereon, which form a part of this specification.

These improvements consist in using electricity as an agent for causing machinery to stop automatically. In many cases such an agent is simpler of application and more prompt and certain in action than the mechanical means heretofore used. I have applied it to slubbing, intermediate, and drawing frames, and also to carding-engines, to stop the respective machines, when thread, sliver, or web breaks, and it may be applied with advantage to many similar purposes.

A battery being provided, (a slow and constant one, such as "Leclanche," being preferred,) wires are brought from it to the machine which it is desired to stop self-actingly when a thread, sliver, or web breaks. One of these wires is connected to a metallic part of the machine, and the other wires to a metallic part of the machine also. These metallic parts are arranged so as to have no metallic connection during the ordinary working of the machine, but they are also so arranged that, as soon as breakage of the thread, sliver, or web takes place, metallic connection is at once established between these metallic parts. This connection being established, a current of electricity is allowed to pass, which charges an electro-magnet, which magnet, by reason of the attractive power it thus suddenly acquires, pulls the knocker off into action directly, or by acting on certain lighter parts, which indirectly cause the knocker-off to be brought into action.

The metallic parts, representing the one the negative and the other the positive pole of the battery, are kept apart either by the weight, strength, or friction of the thread, sliver, or web acting on an instrument whose tendency is to connect the said metallic parts, but which tendency is overcome by the weight, strength, or friction of the thread, sliver, or web being removed. Or the parts may be kept separate by the thickness of the thread, sliver, or web which intervenes between them. Thus, in the drawing-frame, Fig. 4, and in the carding-engine, Sheet 1, the calendar-rollers of the former, and the coiler-rollers of the latter, are kept apart by the thickness of the sliver, and for the slubbing and intermediate, and for the back-stop motion of the drawing-frame, a long bottom roller may be used, and a number of top rollers held in position by suitable arms, to be turned by the bottom roller. Of these rollers the bottom one is connected to one pole of the battery, and the other pole is connected to the top rollers, but the thickness of the sliver keeps the two apart until a breakage occurs, and then the top roller comes into contact with the bottom one, and the circuit being completed, the electric current is established, the magnet becomes charged, and acts, as before stated, directly or indirectly on the knocking-off devices.

In the case of the drawing-frame the magnet is placed above, and, when charged, attracts the heavier end of a double lever, thereby depressing the other end. This depression causes it to be brought in position to obstruct the revolving ratchet-wheel placed on the revolving shaft, which shaft is usually employed with the old or spoon-stopping motion. This obstruction causes the V-clutch to act in the usual way and stop the machine. But this clutch is formed with a double incline, and the part of the clutch which slides outward, having got to the top of its incline, is pulled down the other side of the V or incline by the action of the spring used in the knocking-off motion, and the pressure of the half or movable part of the clutch in going the reverse side of the V has the effect of tilting backward the revolving shaft part of a revolution. This slight reverse movement reverses the ratchet-wheel on the revolving shaft, and causes it to raise the light end of the lever, and therefore to force its other end away from the magnet, thus setting it ready for the next breakage.

To prevent a waste of electricity, it is desirable that the circuit should be interrupted as soon as possible after the parts are put in operation for stopping the machine. To effect this it is provided that in the act of knocking off, the circuit is interrupted by the severance of the communication between the battery and one of the metallic parts. On resetting the machine this communication is re-established, but the circuit is not complete, as the sliver or thread intervenes between the metallic parts. When these parts come together through the breakage of the thread or sliver, the circuit is complete for an instant, during which time the electricity is being consumed, and the knocking-off parts are being brought into action, but at the next instant the circuit is interrupted by the severance of the metallic communication between the battery and one of the metallic parts, and so the waste of electricity is avoided.

Such being the nature and object of this, my invention, I will now proceed to describe the same in detail; and, in order that the same may be fully understood, I have hereunto annexed six sheets of drawings, illustrating the application of the invention to carding-engines, drawing-frames, intermediate frames, and slubbing-frames, and, from the following description, aided by the drawings, its application to other like machines will be obvious.

Figure 2:
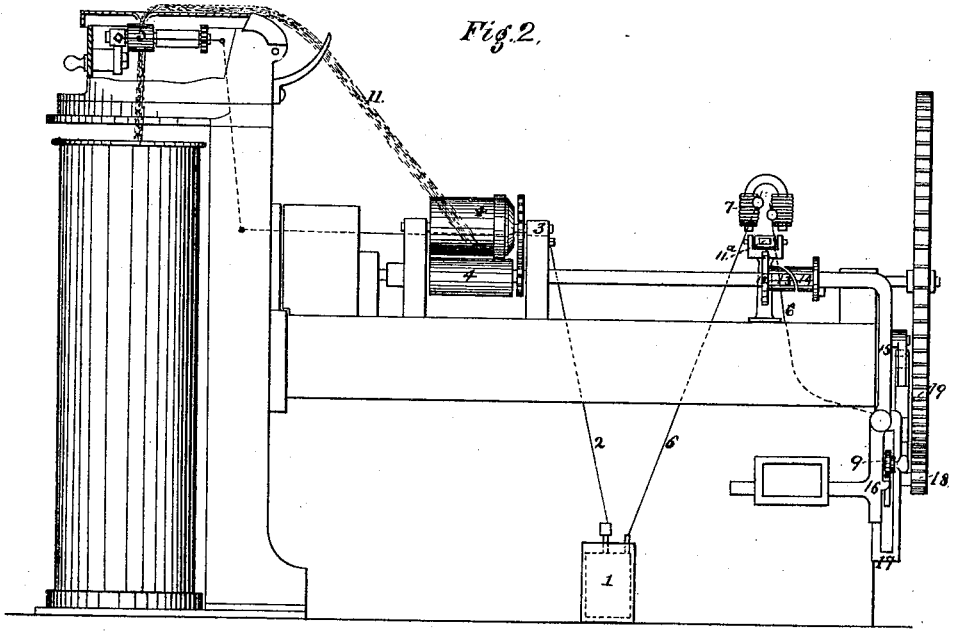
Figure 3:
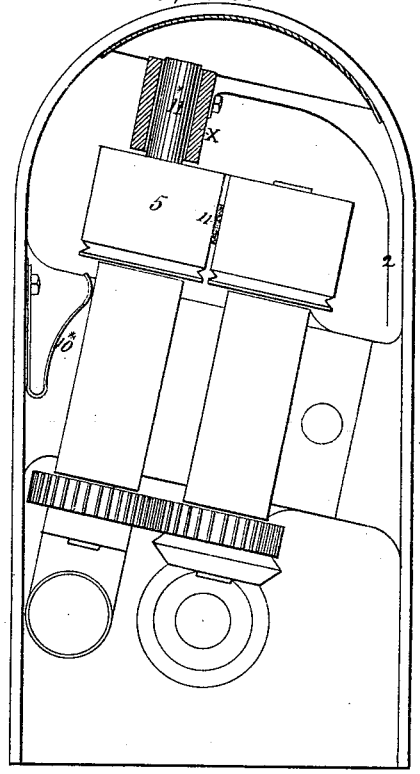
Figure 4:
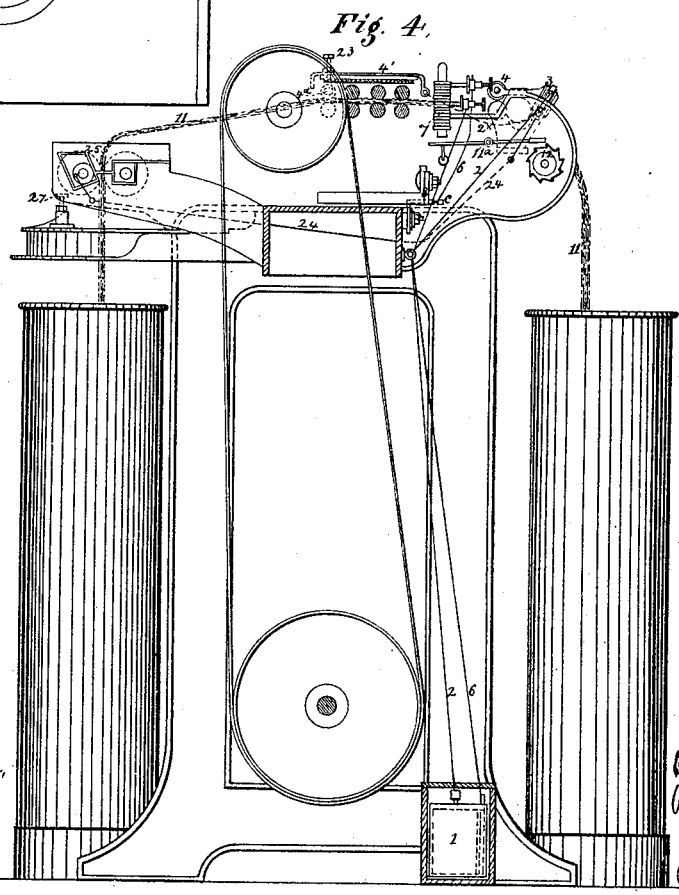
Figure 5:
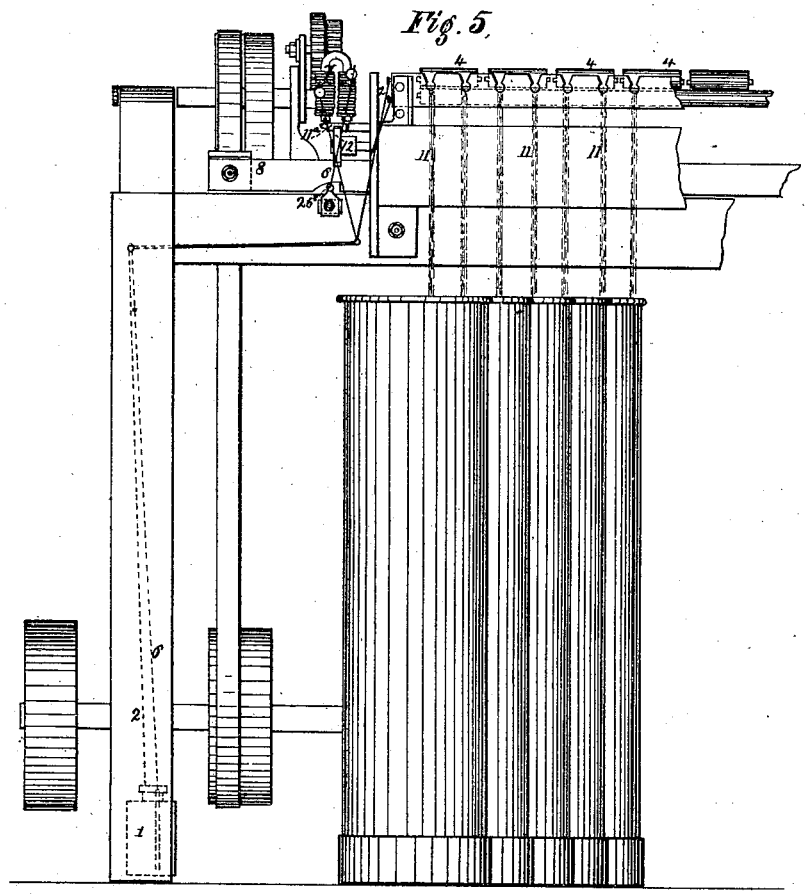
Figure 6:
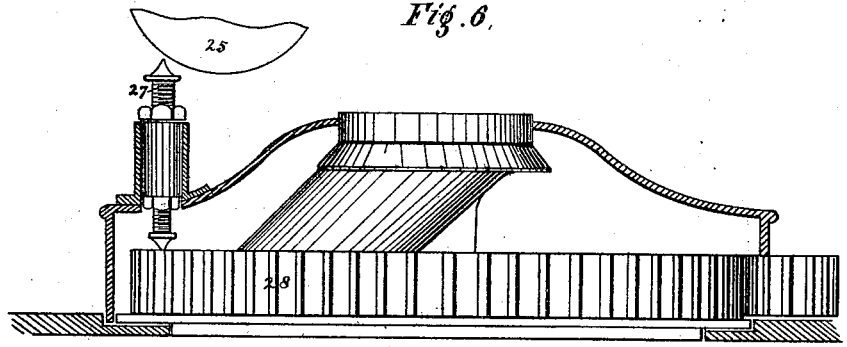

Figure 1 is a side elevation of a carding-engine. Fig. 2 is an elevation of the delivery end of the machine; and Fig. 3 is a plan view (enlarged scale) of the "coiler." Fig. 4 is a partial section of a drawing-frame; and Fig. 5, an elevation of the same. Fig. 6 is a detail of part of the "coiler," with adjusting screw-pin. Fig. 7 is a front elevation of the intermediate frame; Fig. 8, an end elevation of the same; and at Fig. 9 is shown the application of an instrument whose tendency is to connect the metallic parts, as hereinbefore referred to.

In the several views referred to, rollers, or the spindle of a roller or rollers, and the absence of the material or fibers passed between rollers, are the media through which the circuit and current of electricity for stopping the machine is established.

The various parts of the machines in the following descriptions are marked with numbers of reference, and the like number indicates a like part in the several views or drawings.

The battery is marked 1. 2 is a wire extending therefrom and connected with the bearing 3 of the rollers 4 4, and to the bearing X of the coiler-roller 5. 6 is a wire connecting the battery 1, magnet 7, and ratchet-wheel 8', thus charging the ratchet-wheel and the gearing-lever 9 through the stud 10. The ratchet-wheel is insulated from the frame of the machine by a wood or other non-conducting packing. On the breaking of sliver 11, the absence of fiber between the rollers 4 4, or coiler-rollers 5, (see Fig. 3,) admits of the spring 10*, forcing the spindle 11* of the roller 5 into contact with the charged bearing X, and the contact of the two completes the circuit, whereon a current of electricity is established, and the magnet 7 is invested with attractive power, which attracts one end of the lever a, and its other end is depressed and caught by the teeth of the ratchet-wheel 12, the boss of which has an incline, 13, which, acting on the incline of the boss 14, slides the latter on its shaft, and pushes by means of the arm 15 the gearing-lever 9 off its supporting-notch 16, and the lever falls to the bottom of the slot of the bracket 17, thereby removing the pinion 18 out of gear with the wheel 19 on the doffer-shaft, and stops the passage of the fibers through the machine. When the lever 9 falls, the stud 10, no longer being in contact with the lever 9, allows the counterbalanced weight 20 to swing the ratchet-wheel 8' partly around, and so bring its teeth into position for being operated upon by the stud 21 on the doffer, which at each revolution moves the wheel 8' one tooth, so giving time to piece up or join the broken sliver before the pin 10 again rests upon the lever 9, which has in the meantime been lifted into its place again. The blank space on the periphery of the wheel 8' is to allow the pin 21 to pass freely during the ordinary working of the doffer. When the lever 9 falls the current of electricity is broken or cut off, and waste avoided. 22 is a holding-catch, and just so if the calendar-rollers 4 4 are charged, so long as separated from each other by the thickness of the sliver 11, so will the circuit of electricity be incomplete. The severance of the sliver would complete the circuit by metallic contact of the two rollers 4 4, and the magnet would act and stop the machine, as described.

Referring now to the drawing-frame, Sheet 3, 1 is the battery. The wire 2 is connected with the bearing 3 of the back top roller 4. The wire 6 is connected to the magnet 7 and to the pin c. The clearer 4' is also connected by wire 2*. The screw-adjusting pin 23 extends to near the shaft of the front drawing top roller 4$^d$. At this point the electricity is applied for detecting when a "wrapper" is made—that is to say, on the fiber adhering to and wrapping around the top roller 4$^d$, the latter is raised in its bearings until its shaft touches the pin 23, thus completing the electric circuit, and the machine is stopped by catch and ratchet, hereinafter described. Another wire, 24, extends to the calender-roller 25. Here the circuit will be completed, as in the case of the rollers 4 4, when there is not sufficient thickness of fiber to prevent the rollers coming in contact with each other, whereupon the magnet 7 acts, as already described, on the lever 11*. The latter catches against the ratchet 12 on the ordinary knocking-off shaft, and on the strap fork-bar 8 being moved longitudinally the notched part 26 is brought over the pin c, (insulated by wood or other non-conducting packing,) and so the circuit is broken, as in the machine already described, and the waste of electricity is avoided.

Fig. 6 is a detail of a "coiler" for sliver-cans, and the pin 27. When the can is full of fiber the latter slightly raises the wheel 28, and the pin 27 thereon touches the roller 25, and the circuit is completed and the machine stopped. This may be termed a "full-can stop-motion," for when the can (whose location, as will be understood, is just beneath the wheel 28) has become as full as desired, the upward pressure of the accumulating fiber therein, acting on the under smooth surface or plate of this wheel, lifts it until the pin 27 touches roller 25, and brings the stop-motion into action. In this application of my invention the sliver does not break to effect a stoppage.

The intermediate frame (shown on Sheet 4) is provided with a like battery, 1, magnet 7, and wires 2 and 6, the wire 2 being connected with the rail 8, and the other wire, 6, is attached to the pendent arm 8*, fixed to the strap-fork rail 8. When the machine is working, the lower part of the arm 8* is in contact with the spindle of the bottom roller 4, which is thus charged. On the other end of this bottom roller is a boss, having a cam-groove, 29, therein, within which groove a pin attached to the arm 12 is received. The rotation of the boss gives a reciprocating motion to the arm 12, its notched head being thus caused to pass to and fro beneath the catch-lever 11ª, which is attached to the strap-fork bar 8.

The action is as follows: On an end breaking, the rollers 4 4 come in contact and the circuit is completed, whereupon the magnet 7 attracts the end of the catch-lever 11ª. Its other end is caught by the notch of the vibrating arm 12, and the strap-fork bar is forced longitudinally, removing the catch-lever 11ª clear of the magnet 7, and the pendent arm 8* is carried longitudinally away from the spindle of the bottom roller 4, breaking the circuit, and the strap is at the same time, and by the same movement of the strap-bar, transferred to the loose pulley, and the machine is stopped and waste of electricity is avoided.

It is important to notice that, in practicing my invention, by the use of rollers or the spindle of a roller or rollers I avoid putting drag or friction on the cotton or sliver, but simply press it. The set of rollers employed may be made to answer as draft-rollers.

In connection with two ends passing between two rollers, for the purpose of securing the action by completion of the circuit when one end breaks, we employ the roller 30, (shown at Fig. 9,) which, it will be seen, is provided with grooves. These extend partly around the circumference. An end is passed through each groove, so that if either be broken contact of the rollers is insured and the current established, and the machine stopped, as described.

The slubbing-frame is shown at Fig. 10. The instruments or feelers 31 are mounted on one common axis, to which axis one pole of the battery is connected, the other pole or wire being connected to the bracket or roller 4.

The tendency of the instrument or feeler is to connect the metallic surfaces, (see Figs. 10 and 10ª,) and so complete the circuit; but the thickness of the intervening sliver 11 prevents contact, except when broken or removed from under the instrument.

It will be observed that the passage of the sliver serves to clean the metallic surfaces, which, upon a break occurring, are to come into contact, so that there is no liability of a failure to complete the circuit by the accidental presence of stray fibers between such surfaces.

From the examples above given of the application of this our said invention to carding-engines, drawing-frames, intermediate frames, and slubbing-frames, its application to other like machines employed in the working of cotton, wool, and other fibers will be obvious and readily understood.

The electricity may be generated by means of any appropriate electro-magnetic machine, as well as by a battery.

Having thus fully described the nature and particulars of my invention, together with the manner in which the same is to be or may be performed or carried into practical effect, in order to distinguish and point out what is old and not claimed, and what is new and claimed as my invention, I would have it understood that I lay no claim to any of the mere mechanical parts referred to when considered separately; these our present improvements being, in fact, based upon those described in the specification of the English Letters Patent No. 34, in the year 1863, granted to John Howard and to John Bullough, the party to this present application. For instance, I do not broadly claim the use of a battery, nor of electro-magnets with wires, *per se*, for the purpose described; but

What I do claim is—

1. The combination, in fiber-preparing machinery, with the ordinary rolls, or with an ordinary roll and a series of rollers having a common spindle, one of the rolls or series of rolls being insulated, of an electric circuit, whose terminals are at such rolls or roll and series of rolls, and which controls alarm or stopping apparatus, or both, the rolls coming together and closing the circuit upon the breaking of the fiber, substantially as set forth.

2. The gravitating-instruments or feelers, numbered 31, (see Figs. 10 and 10ª,) when mounted on a common axis and resting on the fiber, in connection with the pole of a battery, the thickness of the fiber being utilized for preventing the completion of the electric current by separating the feelers from the rolls.

3. The stop-rod 8, or its equivalent gearing-lever 9, constructed and applied for the purpose of breaking the electric current, in the manner and by the means herein shown and described.

4. In electric stop-motions for cotton-preparing machinery or similar machinery, the described mode of keeping clean the metallic surfaces which are to be brought into contact to complete the circuit, when a break occurs, by means of the fiber passing between them while under treatment.

5. The combination, with stop-motions for cotton-preparing and similar machinery for treating fibrous material, of rollers, between which the fiber passes, for making a metallic connection to complete an electric circuit.

6. The automatic full-can stop-motion, operating by the pressure of the accumulated sliver in the can, to lift a pin or its equivalent to complete the circuit and stop the mechanism, substantially as shown and described.

JOHN BULLOUGH.

Witnesses:
W. R. EDELEN,
WM. T. HORROBIN.